July 10, 1923.
K. R. STRANDELL
PRESSURE GAUGE
Filed Feb. 2, 1921
1,461,200
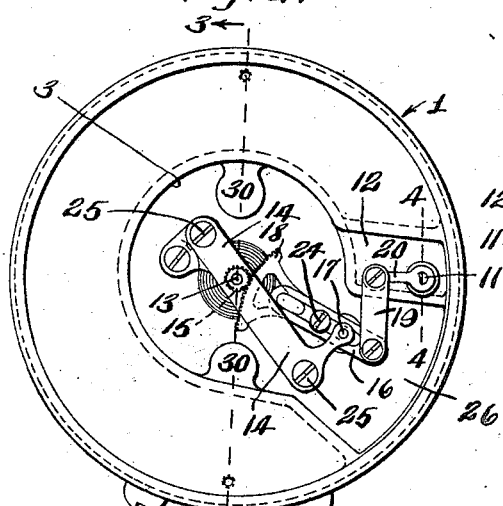
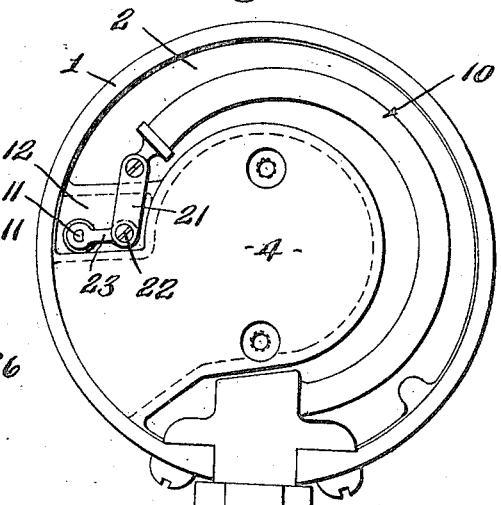
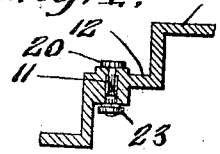
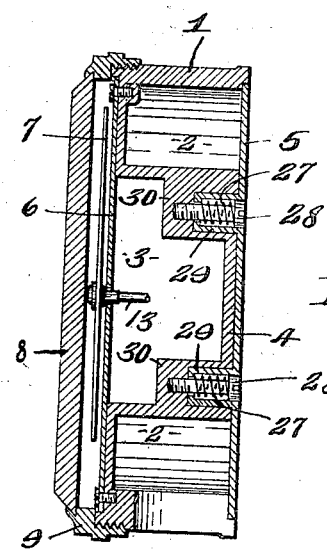
Knut R. Strandell
INVENTOR.
BY
Parsons & Bodell
ATTORNEYS.

Patented July 10, 1923.

1,461,200

UNITED STATES PATENT OFFICE.

KNUT R. STRANDELL, OF SYRACUSE, NEW YORK.

PRESSURE GAUGE.

Application filed February 2, 1921. Serial No. 441,916.

*To all whom it may concern:*

Be it known that I, KNUT ROBERT STRANDELL, a subject of the King of Sweden, a resident of the United States, and a resident of Syracuse, in the county of Onondaga and State of New York, have invented a certain new and useful Pressure Gauge, of which the following is a specification.

This invention relates to pressure gauges and has for its object a particularly simple and efficient construction by which the mechanism and dial of the gauge are relieved of pressure when the actuating element, as a Bourdon tube, breaks and permits the internal pressure to escape.

The invention consists in the novel features and in the combinations and constructions hereinafter set forth and claimed.

In describing this invention, reference is had to the accompanying drawings, in which like characters designate corresponding parts in all the views.

Figure 1 is a front elevation, the dial or gauge plate and indicator being removed.

Figure 2 is a rear elevation, the rear cover plate being removed.

Figure 3 is a sectional view on line 3—3, Figure 1.

Figure 4 is an enlarged fragmentary sectional view on line 4—4, Figure 1.

This pressure gauge comprises generally a casing having a closed chamber in which is located the actuating element, which is operated by pressure as steam or air, a dial mounted on the front of the casing, an indicator movable over the dial plate and mechanism located within the casing, but outside of said chamber for actuating the indicator, said mechanism including a portion, as a shaft, journalled in the wall of the casing and connected at its inner end to the actuating element. This element may be of any type, as a diaphragm or Bourdon tube, and for the sake of brevity and convenience is referred to in the specification and claims as a Bourdon tube.

1 designates the casing which is here shown as circular or cylindrical in general form, the casing being also formed with an arc-shaped and nearly annular chamber 2, which encloses a central space 3 within the casing, this space 3 being open at its front side and having a rear wall 4. The chamber 2 is closed at its front, rear and outer or peripheral and inner sides and at its ends, the rear side being detachable and comprising a circular plate 5 which overlies the wall 4 and which is yieldingly held in position. 6 is the dial plate mounted on the front side of the casing 1 and extending over the front end of the space 3. 7 is the indicator or hand movable over the dial, and 8 is a suitable lens held in position by a ring 9 threading on the periphery of the casing 1. 10 designates the Bourdon tube, mounted in the chamber 2 and having means for connection in the pressure pipe.

The mechanism for actuating the indicator 7, that is, the connections between the Bourdon tube and the indicator 7, comprises a rock shaft 11 journalled in an inset portion 12 of an end wall of the chamber 3 and connected at its inner end to the Bourdon tube and at its outer ends to the indicator. As here illustrated, the connections to the indicator comprises a shaft 13 arranged coaxially of the casing 1 and supported at its front end in the bracket 14 to be presently described and in the rear wall 4 of the space 3, a pinion 15 mounted on the shaft and a lever 16 pivoted at 17 and having a segment 18 at one end meshing with the pinion 15 and connected at its other end by a link 19 to a rock arm 20 on the outer or rear end of the shaft 11. The shaft 11 is connected at its inner end to the free end of the Bourdon tube by a link 21, which is connected at 22 to a rock arm 23 on the inner end of the shaft 11. The lever 16 is composed of two parts adjustable endwisely relatively to each other and held in their adjusted position by the clamping member 24. The pivot 17 of the lever is carried by the bracket 14 which is secured to the wall 4 of the casing by screws 25. This bracket 14 has an opening or bearing for the shaft 13. The lever 16 and the link 18 extend in the space 26 between the ends of the circular chamber 2 which space 26 communicates with the space 3.

The rear wall 5 of the chamber 2 is yieldingly held in position by springs 27 interposed between the heads of screws 28 and inturned flanges or seats 29 provided on tubes or thimbles projecting from the plate 5, the screw threading into lugs 30 extending into the space 3.

In operation, motion is transmitted from the Bourdon tube to the shaft 13 through the rock shaft 11 and the lever 16 and the joint or bearing of the rock shaft is suitably packed to prevent the escape of pressure from the chamber 2 into the spaces 3 and 26 so that, if the Bourdon tube breaks or explodes the steam pressure will not break the gauge mechanism and the dial and is free to escape without doing injury past the spring-pressed plate 5.

What I claim is:

1. A pressure gauge comprising a casing, a Bourdon tube in the casing, the casing being formed with an arc shaped chamber in which the tube is located, a dial plate on the front of the casing, an indicator movable over the dial and mechanism in the rear of the plate and outside of said chamber for actuating the indicator, said mechanism comprising a rock shaft extending through a wall of said chamber and connected to the Bourdon tube to be rocked thereby.

2. A pressure gauge comprising a casing, a Bourdon tube in the casing, the casing being formed with an arc-shaped chamber in which the tube is located, a dial plate on the front of the casing, an indicator movable over the dial and mechanism in the rear of the plate and outside of said chamber for actuating the indicator, said mechanism comprising a rock shaft extending through a wall of said chamber and connected to the Bourdon tube to be rocked thereby, a wall closing the rear side of the chamber being yieldingly held in position, and means for yieldingly securing the wall to the casing.

3. A pressure gauge comprising a cylindrical casing having an arcuate chamber closed at its front side and ends, and its inner and outer arc-shaped sides, the ends being spaced apart, the casing also having a wall on its rear side closing the rear end of the space confined by the inner arcuate wall and the end walls of said chamber and the peripheral wall of the casing, a dial mounted on the front of the casing, an indicator movable over the dial and a Bourdon tube mounted in said arcuate chamber, mechanism for actuating the indicator comprising a shaft extending through a wall of said arcuate chamber and connected at its inner end to the Bourdon tube, and means for transmitting the motion of the rock shaft to the indicator, such means being located in the space encompassed by the inner wall of the arcuate chamber, and a wall closing the rear side of the arcuate chamber, and means for yieldingly securing the same to the casing.

In testimony whereof, I have hereunto signed my name, at Syracuse, in the county of Onondaga, and State of New York, this 21st day of October, 1920.

KNUT R. STRANDELL.